(12) United States Patent
Britt et al.

(10) Patent No.: US 9,454,575 B2
(45) Date of Patent: Sep. 27, 2016

(54) PROCESSING A METRIC OF A COMPONENT OF A SOFTWARE-DEFINED NETWORK

(71) Applicant: Hewlett-Packard Development Company, L.P., Houston, TX (US)

(72) Inventors: Steven V. Britt, Roseville, CA (US); Anh Tuan Vuong, Sacramento, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 186 days.

(21) Appl. No.: 14/229,301

(22) Filed: Mar. 28, 2014

(65) Prior Publication Data

US 2015/0281018 A1    Oct. 1, 2015

(51) Int. Cl.
*G06F 17/30* (2006.01)
*H04L 12/26* (2006.01)

(52) U.S. Cl.
CPC ......... *G06F 17/30477* (2013.01); *H04L 43/04* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 2012/0155467 A1 | 6/2012 | Appenzeller | |
| 2012/0210088 A1* | 8/2012 | Iizuka | G06F 12/0238 711/166 |
| 2013/0010600 A1 | 1/2013 | Jocha et al. | |
| 2014/0173018 A1* | 6/2014 | Westphal | H04L 41/0823 709/213 |
| 2014/0188804 A1* | 7/2014 | Gokhale | G06F 21/6218 707/645 |
| 2014/0215057 A1* | 7/2014 | Walsh | H04L 43/0823 709/224 |
| 2014/0226467 A1* | 8/2014 | Park | H04L 41/0806 370/229 |
| 2014/0337509 A1* | 11/2014 | Manghirmalani | G06F 11/3006 709/224 |
| 2015/0113132 A1* | 4/2015 | Srinivas | H04L 41/0816 709/224 |
| 2015/0135012 A1* | 5/2015 | Bhalla | H04L 41/147 714/26 |
| 2015/0142936 A1* | 5/2015 | Srinivas | H04L 41/0816 709/221 |
| 2015/0142962 A1* | 5/2015 | Srinivas | H04L 41/0816 709/224 |
| 2015/0172185 A1* | 6/2015 | Zhang | H04L 45/72 370/389 |
| 2015/0172208 A1* | 6/2015 | DeCusatis | H04L 47/70 709/226 |

FOREIGN PATENT DOCUMENTS

WO    2013059683    4/2013

OTHER PUBLICATIONS

"Performance aware software defined networking", Jan. 6, 2013, 7 pages.
HP VAN SDN Controller Administrator Guide, Jan. 2014, 102 pages, Edition 1, Revision 2.

* cited by examiner

*Primary Examiner* — Hung Le
(74) *Attorney, Agent, or Firm* — Brooks, Cameron & Huebsch, PLLC (57) ABSTRACT

Processing a metric of a component of a SDN can include registering a unique identifier associated with the metric in storage of the SDN.

18 Claims, 4 Drawing Sheets

PROCESSING A METRIC OF A COMPONENT OF A SOFTWARE-DEFINED NETWORK

BACKGROUND

Entities can maintain networks with one or more connections to the Internet and/or Intranet. Networks can include a plurality of resources connected by communication links, and can be used to connect people, provide services—both internally and externally via the Internet and/or Intranet—and/or organize information, among other activities associated with an entity. An example network can include a software-defined network (SDN).

DETAILED DESCRIPTION

An entity may desire to track metrics for a variety of reasons. Metrics can be tracked to identify failure, ambiguities, and/or operating characteristics of trends of a network, systems attached to the network, or program instructions (e.g., applications) running on those systems, among other purposes. A metric, as used herein, can include a property and/or metadata of the measured network, systems, and/or program instructions. Example metrics can include cumulative measures of an event occurrence, storage consumed by metric data, number of hops, speed of path, packet loss, latency, path reliability, path bandwidth, CPU consumption, and/or memory consumption, among other metrics.

A SDN can include a form of network virtualization in which the control plane is separated from the data plane and is implemented in a software application. For instance, a SDN can include a controller. The controller can include a virtual and/or physical component that is designated and/or designed to exercise control over traffic in the network. The controller can maintain a set of network policies and network knowledge for routing and programming a flow table of network traffic. For instance, the controller can be in communication with a plurality of network devices in the network, such as switches, routers, bridges and/or other hops in the network, to manage network traffic. The controller can direct network traffic via a communication protocol with the plurality of network devices, and/or the network traffic can pass directly through the network controller.

Current SDNs can include components within a controller and components external to a controller. A component, as used herein, can include program instructions or a combination of hardware (e.g., network devices) and program instructions. Tracking metrics of the component external to the controller can occur using the external component (e.g., an application/node) to self-track. However, the controller may be unable to process all metrics across the SDN as the controller may be unaware of metrics tracked by the external components.

In contrast, examples of the present disclosure can process metrics globally across a SDN using a common metric service. The metric service can be used by SDN applications. The SDN applications may have components that are internal and/or external to the controller. The metric service can allow such components, irrespective of their location relative to the controller, to register metrics of various types with the metric service. The metric service can process metrics of a component external to the controller using a metric proxy. Thereby, an external component does not have to track and/or save data relevant to the metrics. The external component can request a metric be created by communicating with the metric proxy and can send tracked metric values to the metric proxy.

The metric service can save an instance of each metric and a unique identifier associated with each of the metrics. The unique identifier allows the metric service and/or components to identify the metric during subsequent updates of the metric value. The updates may be done with any frequency and at regular or irregular intervals. Metric values can be saved as time series data. For instance, the metric service can periodically summarize metric values and persist the summarized values to disk as time series data. The time series data may be retrieved by other applications that wish to analyze it. Thus, metrics of the SDN and attached systems can be centrally processed and synchronized by the same predefined periods of time. Additional examples, advantages, features, modifications and the like are described below with reference to the drawings.

Figure 1:
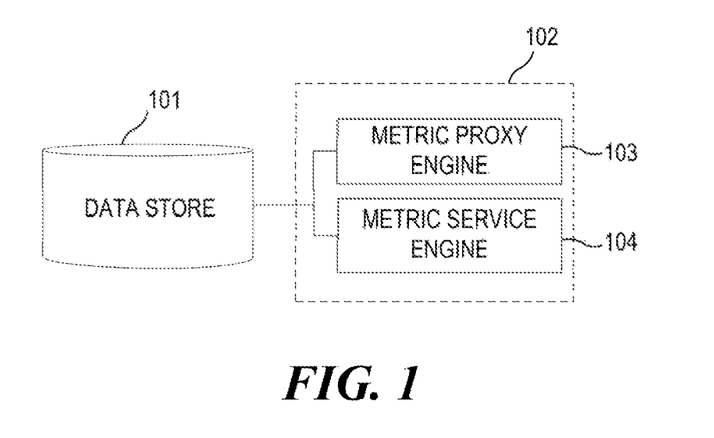
FIGS. 1-2 illustrate examples of systems according to the present disclosure.
Figure 2:
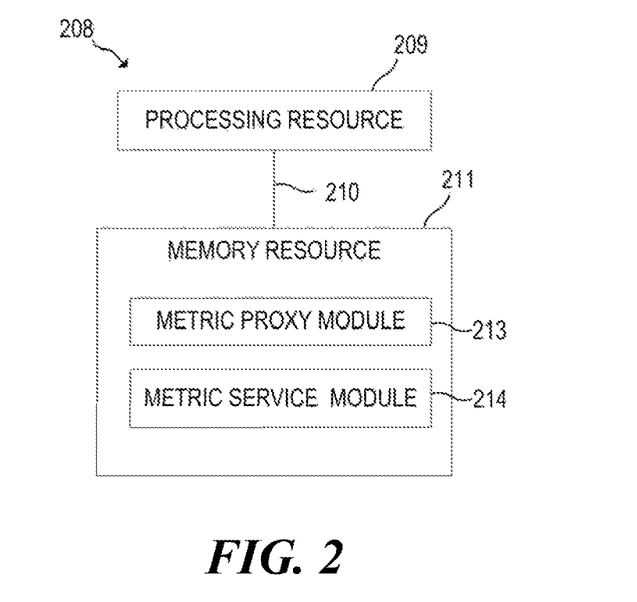

FIGS. 1-2 illustrate examples of systems 100, 208 according to the present disclosure. FIG. 1 illustrates a diagram of an example of a system 100 for processing a metric of an external component according to the present disclosure. The system 100 can include a data store 101, metric processing system 102, and/or a number of engines 103, 104. The metric processing system 102 can be in communication with the data store 101 via a communication link, and can include the number of engines (e.g., metric proxy engine 103 and metric service engine 104). The metric processing system 102 can include additional or fewer engines than illustrated to perform the various functions described herein.

The number of engines 103, 104 can include a combination of hardware and programming that is configured to perform a number of functions described herein (e.g., process a metric of an external component). The programming can include program instructions (e.g., software, firmware, etc.) stored in a memory resource (e.g., computer readable medium, machine readable medium, etc.) as well as hard-wired program (e.g., logic).

The metric proxy engine 103 can include hardware and/or a combination of hardware and programming to create a descriptor object in response to a request for a metric from a component external to a controller of a SDN. The metric proxy engine 103 can notify the metric service engine 104 of the created descriptor object. An object, as used herein, can include a location in memory having a value and referenced by an identifier. The created descriptor object can include the identification metadata of the metric. The controller can include a SDN network controller, as discussed further herein.

Identification metadata can include, but is not limited to, a component ID, primary tag, secondary tag, and metric name. For instance, component ID can identify the component requesting the metric. The primary and secondary tags can be provided as a means of grouping metrics for a specific component.

In various examples, an external component engine can send the request for the metric to the metric proxy engine 103 using an application program interface (API). An API, as used herein, can include a specification that can be used as an interface by program instructions (e.g., components, services, etc.) to communicate. The external component engine can include hardware and/or a combination of hardware and programming to perform operations of the external component. For instance, the external component engine can send an API call to the metric proxy engine 103. The API call can include the identification metadata for the requested metric.

The metric service engine 104 can include hardware and/or a combination of hardware and programming to create a metric instance using the descriptor object and register a unique identifier associated with the metric in storage of the SDN. For instance, registering the unique identifier can include mapping identification metadata of the metric to the unique identifier. The instance of the metric and the unique identifier can be saved in storage of the SDN. For example, the metric instance and/or the unique identifier can be saved in storage (e.g., persisted in memory) of the controller. Although examples in accordance with the present disclosure are not so limited and the metric instance and/or the unique identifier can be saved in storage external to the controller. In such an example, the metric service engine 104 and/or the metric proxy engine 103 can be located on a component of the SDN that is external to the controller.

The metric instance saved can, for instance, include a created object for the metric (e.g., an object containing descriptor information and/or other metadata of the metric, as discussed further herein). For instance, the metric instance can include an object in storage (e.g., RAM) that tracks value updates of the metric, as discussed further herein. The metric instance can be referred to, for instance, as a metric descriptor. The unique identifier registered can be sent to the external component using the metric proxy engine 103. For instance, the metric proxy engine 103 can return the unique identifier registered (e.g., assigned) to the new metric as part of its return (e.g., to the external component) to the API call that requested creation of the metric (e.g., the API call from the external component requesting the creation of the metric).

In various examples, the metric service engine 104 can create the metric instance. For example, using the descriptor object created by the metric proxy engine 103 at the behest of an external component, the metric service engine 104 can create the metric instance. The descriptor object can correspond to the type of metric requested by the external component and the metric type can correspond to a descriptor type and a metric descriptor builder type. A metric descriptor builder can include program instructions of a design pattern that allow most fields of a metric descriptor to default to commonly-used values. The metric descriptor type can specify values for the fields of the metric descriptor builder that are to differ from default values.

In a number of examples, the external component engine can update a value of the metric. For instance, the external component engine (and/or a component internal to the controller) can send an API call to communicate a value of the metric to the metric proxy engine 103. The call can include the value of the metric and the unique identifier of the metric instance/metric to be updated. The value can include an updated and/or non-updated value, for instance. The metric proxy engine 103 can update the instance of the metric with the value in response to the received API call. The external component engine can send a value of the metric and the unique identifier of the metric instance to be updated at a predefined period of time, when the value is changed, and/or randomly, among other times. The metric service engine 104 can, for instance, time stamp the value sent from the external component engine with a current time of the controller when the value is received from the metric proxy engine 103.

The metric service engine 104, in various examples, can save the time stamped value of the metric (e.g., in storage of the controller) at a predefined period of time. For instance, a time stamped value for each existing metric instance within storage of the SDN (e.g., within the controller) can be saved at the predefined period of time. That is, the predefined period of time can include a summary interval for which values of each metric are tracked by the controller and/or the SDN are summarized. The summarized values can be persisted (e.g., stored as data in non-volatile storage such as a hard drive or flash memory). Without persisting the data the value would exist only in random-access memory (RAM) of the controller and/or other component of the SDN and may be lost when the RAM loses power. Thereby, prior to persisting the updated time stamped value at the summary interval, the updated time stamped value saved by the metric proxy engine 103 is stored in RAM.

Saving a summarized value for each metric tracked by the controller and/or other component of the SDN at predefined periods of time can synchronize the values of metrics tracked. Thus, metrics of the SDN and attached systems can be centrally processed and synchronized by the same predefined periods of time. The summarized values can be saved as time series data. The time series data may be retrieved by other applications that wish to analyze it, and information is persisted along with the summarized values that permits the requestor to either analyze the raw summarized values that are returned or normalize them as rates. Because the metric values of a plurality of metrics tracked are all synchronized, troubleshooting across the plurality of metrics tracked can be more efficient than when the values are not synchronized.

Although the example of FIG. 1, illustrates using a metric proxy engine 103, examples in accordance with the present disclosure are not so limited. In a number of examples, the metric service engine 104 can receive a request for a metric from an internal component of the controller and can create a metric instance in response the request. The request can include a descriptor object, for example.

In various examples, the metric service engine 104 can save the persisted data (e.g., summarized values saved in non-volatile storage of the controller) based on how many values (e.g., data points) for the metric are received during the summary interval, and when the values were received for at least one existing metric instance of a plurality of existing metric instances. For example, in some instances, a summarized metric value may appear unusually low or high when compared to the summarized values from other summary intervals until it is understood that the summarized value in question was gathered for a shorter or longer time span than the nominal length of the summary interval. The time span for the metric value may be used to normalize the metric values to eliminate disparities in absolute value computed for various summary intervals. For instance, for a metric, the normalized value for the summary interval can be computed by dividing the summarized value of the metric during each summary interval by the time span for the metric corresponding to each summary interval. The time span for a summary interval is simply a measurement of how much time during the summary interval the summarized values actually represent. For example, a metric can have a summary interval of 60 seconds; if its value is updated once at the start of the interval and then again 20 seconds later, its time span can be 20 seconds because the value during the last 40 seconds of the summary interval is unknown. During the subsequent 60 second summary interval, if the value is again updated 55 seconds into that subsequent interval, the time span reported for the value during the second summary interval can be 95 seconds (the last 40 seconds from the first interval plus the first 55 seconds from the second interval).

In accordance with some examples, the metric service engine 104 can delete data stored (e.g., persisted data), including the instance of the metric and/or time stamped values of the metric, after a threshold period of time (e.g., aging out data). The threshold period of time can include, for example, a year a month, etc. Alternatively and/or in addition, a threshold data size can be used to initiate data deletion. For instance, a threshold data size can include an absolute size that the data store may not grow beyond or a maximum percentage of all available space that can be used by the data store. The data to be deleted in such cases may be selected using various methods, including but not limited to deleting the oldest data for each metric until the data store is again under the threshold data size. By automatically deleting persisted data associated with the metric service, the persisted data may not grow unbounded.

In various examples, as further discussed herein, the metric service engine 104 can restore a metric instance associated with a metric upon failure of a portion of the SDN. The portion of the SDN can include the external component, internal component, controller, metric proxy engine 103, and/or metric service engine 104, or a combination thereof. For instance, an external component and/or the controller/metric proxy engine 103 can have a failure. The failure can cause the portion of the SDN to shut-down for a period of time. In response to the failure and a subsequent call (e.g., API call) for the metric from a component of the SDN, metadata of the metric can be identified in storage of the SDN and the metric instance can be restored using the identified metadata.

FIG. 2 illustrates a diagram of an example computing device 208 according to the present disclosure. The computing device 208 can utilize software, hardware, firmware, and/or logic to perform a number of functions described herein.

The computing device 208 can be any combination of hardware and program instructions configured to share information. The hardware, for example can include a processing resource 209 and/or a memory resource 211 (e.g., computer-readable medium (CRM), machine readable medium (MRM), database, etc.). A processing resource 209, as used herein, can include any number of processors capable of executing instructions stored by a memory resource 211. Processing resource 209 may be integrated in a single device or distributed across multiple devices. The program instructions (e.g., computer-readable instructions (CRI)) can include instructions stored on the memory resource 211 and executable by the processing resource 209 to implement a desired function (e.g., process a metric of an external component).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules 213, 214 can include CRI that when executed by the processing resource 209 can perform a number of functions. The number of modules 213, 214 can be sub-modules of other modules. For example, the metric proxy module 213 and the metric service module 214 can be sub-modules and/or contained within the same computing device. In another example, the number of nodules 213, 214 can comprise individual modules at separate and distinct locations (e.g., CRM, etc.).

Each of the number of modules 213, 214 can include instructions that when executed by the processing resource 209 can function as a corresponding engine as described herein. For example, the metric proxy module 213 can include instructions that when executed by the processing resource 209 can function as the metric proxy engine 103. In another example, the metric service module 214 can include instructions that when executed by the processing resource 209 can function as the metric service engine 104.

Figure 3:
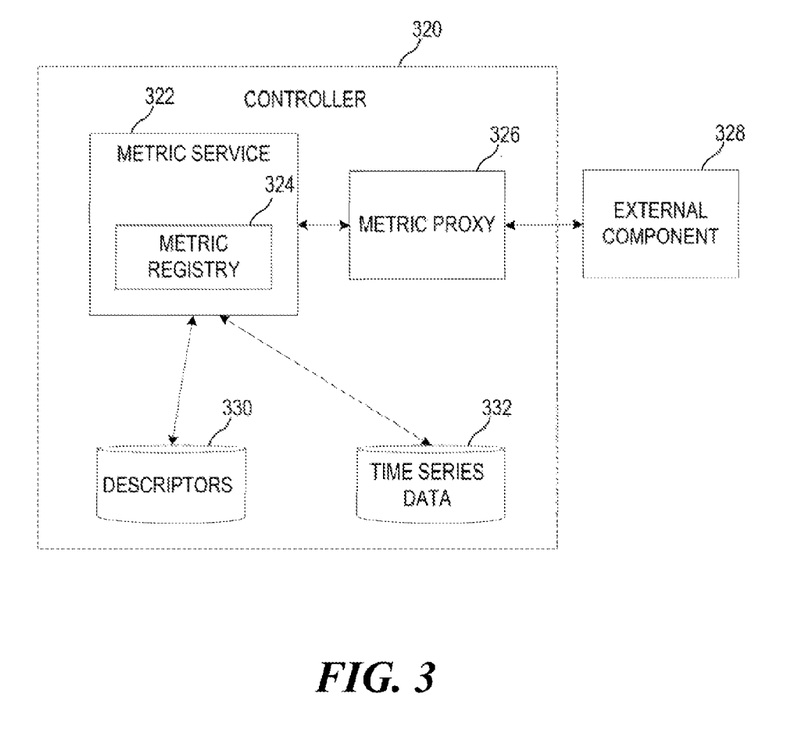
FIG. 3 is a flow diagram of an example of an environment for processing metrics of components of a SDN according to the present disclosure.

FIG. 3 is a flow diagram of an example of an environment for processing metrics of components of a SDN according to the present disclosure. The environment, as illustrated by FIG. 3, can include a controller 320.

The controller 20 can include a SDN network controller (e.g., as discussed further herein). SDN is a form of network virtualization in which the control plane is separated from the data plane and implemented in a software application. Network administrators can therefore have programmable centralized control of network traffic without requiring physical access to the network's hardware devices. In some examples, the controller 320 can be a discrete device, such as a server. In some examples, the network controller 320 can be a distributed network controller, for example, such as a cloud-provided functionality. One example of a protocol for SDN is OpenFlow, which is a communication protocol that gives access to the forwarding plane of a network switch over the network. Some examples of the present disclosure can operate according to an OpenFlow or other SDN protocol, and/or a hybrid of a SDN protocol combined with "normal" (e.g., distributed control plane) networking.

The controller 320 can be in communication with and/or have control over network devices and/or components. For example, network devices can be switches, routers, hubs, and/or bridges, among other devices and/or hops. Examples are not limited to the specific number of network components illustrated in the network. In various examples, a portion of the components may be external to the controller 320. For instance, external component 328 is external to the controller 320.

The controller 320 and the network devices and/or components can be in communication using a communication protocol. For instance, the communication protocol can include a communication link between the controller 320 and the network devices and/or components using a secure channel. The communication protocol, in various examples, can include an OpenFlow protocol. As an example, the controller 320 can use the communication protocol to manage the network components.

As illustrated by FIG. 3, the controller 320 can include a metric service 322. The metric service 322 can include hardware and/or program instructions (e.g., computer-readable and executable instructions) configured to track metrics for internal and external components of the SDN. The metric service 322 can create a mapping of metric metadata (e.g., identification metadata of each metric instance) and a unique identifier of each metric. Entries can exists for persisted metric instances that are in use and for metric instances that are no longer in use but for whom data still exists in storage of the controller 320 because the time series data has not yet aged out, as discussed further herein.

The metric service 322 can, in a number of examples, create a metric registry 324. The metric registry 324 can track each metric instance that has been created and is still in use. For instance, entries can exist for metric instances with persisted data and/or without.

The metric service 322 (e.g., using a metric descriptor storage, as discussed further herein) can store descriptor information in storage 330 that can be provided when creating persisted data for a metric instance (e.g., updating the time stamped value) as well as the unique identifier for the metric instance. The descriptors stored by the metric registry 324 can be used to store persisted time series data in storage 332. The descriptor information can be persisted in a file system named descriptors 330. For instance, the descriptor information can include the descriptor object and/or other metric data.

The external component 328 can send a request to the metric proxy 326 (e.g., within the controller 320) to request creation of a metric. The request can be sent, for instance, using an API. For instance, the external component 328 can send an API call to the metric proxy 326. The API call can include identification metadata for the requested metric. For example, the API/API call can include a Representational State Transfer (REST) API/REST API call. Alternatively and/or in addition, an internal component (e.g., not illustrated in FIG. 3) can send a request to the metric service 322 to request creation of the metric. The request from the internal component can include the descriptor object.

In response to the request, the metric proxy 326 can create a descriptor object and notify the metric service 322 of the created descriptor object. The notification can appear, to the metric service 322, as a request for a metric. The metric service 322 can create a metric and the metric registry 324 can store a metric instance of the metric. The metric service 322 can return a unique identifier registered (e.g., assigned) to the new metric to the metric proxy 326, which can provide the unique identifier to the external component 328 and/or the internal component as part of its return from the API call that initiated creation of the metric.

The external component 328 and/or internal component can send updated values for the metric to the controller 320 (and/or a second external component that the metric service 322 and metric proxy 326 reside on, as discussed further below). For instance, the external component 328 can send a call (e.g., an API call) to the metric proxy 326 within the controller 320. The call can include a value for the metric and the unique identifier for the metric to be updated. The metric proxy 326 can update a value for the metric instance associated with the unique identifier using the value. The metric service 322 can time stamp the value for the metric with the current time of the controller 320 when the request for the metric update is received from the metric proxy 326. The metric service 322 can accumulate such updates in RAM for a period of time; the value of some of the metrics may be updated many times during such a period of time, some may be updated infrequently or once, and/or some may not be updated at all. Periodically the metric service 322 can, independently of updating metric values save, in storage 332 of the controller 320, a summarized value for each of a plurality of metric instances saved in the controller 320 at a predefined period of time (e.g., a summary interval) including the updated value (e.g., a time stamped value) for the metric. For instance, the summarized values for each of the plurality of metrics, along with their corresponding time spans as previous discussed, can be persisted in storage 332 of the controller 320.

The time stamped values for each metric can be persisted (at each summary interval), in various ways, as time series data in storage 332. For example, the time series data can include a flat file system and/or a relational database, among other storage techniques.

In various examples, the value for the metric sent from the external component 328 and/or the internal component may or may not include an updated value. For instance, the metric proxy 326 can search for the metric instance within the controller 320 based on the unique identifier (e.g., contained in the call). The metric proxy 326 can apply (e.g., update) the value to the metric instance within the controller 320 in response to the value in the call including an update or not apply the value to the metric instance in response to the value in the call including the same value as previously stored within the controller 320 (e.g., the existing value in RAM is the same as a value sent from the external component 328).

Figure 4:
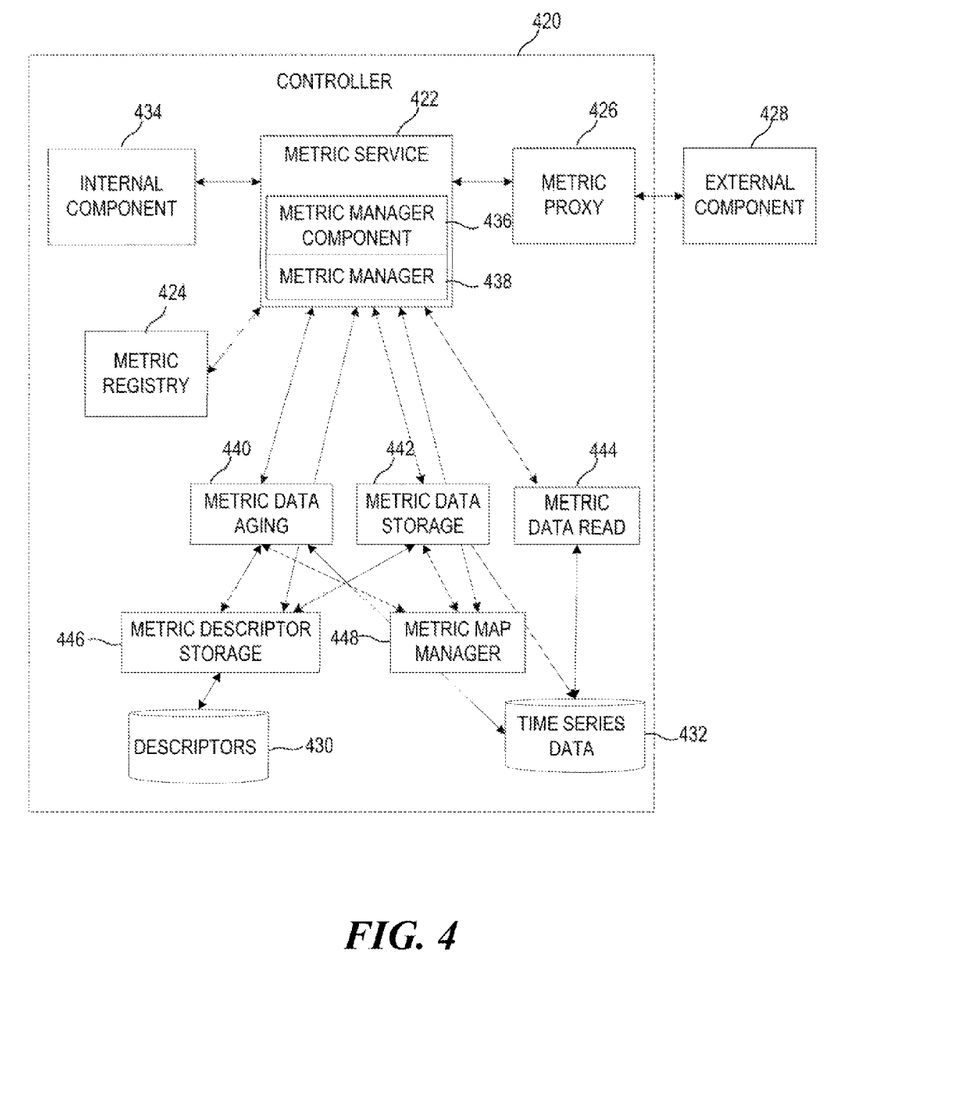
FIG. 4 is a flow diagram of an example of an environment for processing a metrics of components of a SDN according to the present disclosure.

Although the examples of FIG. 3 and FIG. 4, as further discussed herein, illustrate the metric service 322, 422, the metric proxy 326, 426 and the various components of the metric service described herein as residing on the controller 320, 420, examples in accordance with the present disclosure are not so limited. In various examples, the metric service 322, 422, the metric proxy 326, 426 and the various components of the metric service as illustrated by FIG. 3 and FIG. 4 can reside on a component external to the controller 320, 420 (e.g., a separate processing node from the controller 320, 420).

FIG. 4 is a flow diagram of an example of an environment for processing metrics of components of a SDN according to the present disclosure. The environment illustrated by FIG. 4 can include the same environment or a different environment from the environment illustrated in FIG. 3, in a number of examples of the present disclosure.

For instance, the environment can include a SDN with a controller 420. The SDN can include an internal component 434 and an external component 428 to the controller 420. Although the present example illustrates a single internal component 434 and a single external component 428, examples in accordance with the present disclosure can include more or less than one internal component and one external component.

The controller 420 can include a metric service 422 configured to track metrics for internal and external components of the SDN. The metric service 422 can include a metric manager component 436. The metric manager component 436 can include hardware and/or program instructions to launch the metering system within the controller 420. For instance, the metric manager component 436 can create an instance of the metric manager 438. The metric manager 438 can include program instructions to create a number of data structures. The metric manager 438 can disseminate references to the created data structures elsewhere as needed.

The number of data structures created by the metric manager 438 can include the metric registry 424, the metric map manager 448, and the metric descriptor storage 446 data structures. As previously discussed, the metric registry 424 can be used to track each metric instance that has been created and is still in use. The metric map manager 448 can manage a complex multi-level data structure (e.g., a hashmap) that maps the identification metadata of a metric to the unique identifier that is allocated to the metric instance. Entries in the metric map manager 448 can exist for persisted metric instances that are in use and metric instances with persisted values that are not in use (but for which stored time series data has not yet aged out). The metric descriptor storage 446 can retain the descriptor information that is provided when creating persisted data for a metric as well as the unique identifier for the metric instance. The descriptor information is persisted in a file system (e.g., descriptors 430) every time a new metric is created so that the information is retained in case of a failure of the metric service 422 and/or the controller 420. When the metric descriptor storage 446 is allocated, it initializes an in-memory (e.g., RAM) representation of the data from this file (descriptors 430).

Further, the number of data structures created by the metric manager 438 can include the metric data aging 440, the metric data storage 442, and the metric data read 444 data structures. These data structures can orchestrate data persistence, data aging, and data reading of the metric service 422. The metric data storage 442 can coordinate all persistence of values (e.g., time stamped values) of metrics to storage (e.g., in storage 432 as times series data). The metric data storage 442 can periodically fire a worker thread (e.g., sequence of program instructions), such as at the top of each minute, which goes through each metric instance in use and persists their summarized values as needed. The worker thread can use the metric registry 424, the metric map manager 448, and the metric descriptor storage 446 data structures, among others, for this process.

The metric data read 444 data structure can provide backing business logic for API requests (e.g., REST API requests) to retrieve time series data from storage 432 fore specific metric instance. The metric data read 444 can read the time series data from storage 432 (independently from or at the behest of the metric manager 438) to fulfill the request.

The metric data aging 440 data structure can fire a worker thread periodically, such as once per day, to delete (e.g., trim) data from the data structures and storage (e.g., data saved in RAM and data saved in non-volatile storage) after a threshold period of time and/or a threshold data size is reached (e.g., aging out data). For instance, the threshold period of time can include a period of time the data has been saved, the data has not been used, and/or the metric has not been used, among other times. Examples threshold periods of time can include a month, three months, a year, etc. A threshold data size can include a maximum data size of data stored (e.g., for/by the metric service 422). The data can be deleted, for instance, based on the time stamp of each value and/or a time stamp of the creation of the metric. For example, the metric descriptor storage 446 can retain a time stamp for each entry that the metric data aging 440 can consult to determine whether to delete data. Further, once a metric is created, the metric descriptor storage 446 can initialize a time stamp with the creation time of the metric.

Although the example of FIG. 4 illustrates a number of components and data structures, examples in accordance with the present disclosure are not limited to the components and data structures illustrated by FIG. 4. For instance, examples in accordance with the present disclosure can include fewer or more components and data structures than illustrated by FIG. 4.

For example, the number of data structures created by the metric manager 438 can include a JMXreporter. A JMXreporter data structure can be notified by the metric registry 424 when a metric is created whose value is configured to be exposed via Java Management Extensions (JMX). The JMXreporter can register the metric with the controller's 420 JMX server instance. When values for the metric are refreshed via the JMX server, the JMX server extracts data directly from the metric instance within the controller 420. When the metric is unregistered from the metric registry 424, the JMXreporter is notified and it unregisters the metric from the JMX server instance.

As an example of creating a metric requested by an external component 428, the external component 428 can send an API call to the metric proxy 426 to request the creation of a metric. The metric proxy 426 can create a descriptor object in response to the request and notify the metric service 422 of the descriptor object. Alternatively, as an example of creating a metric requested by an internal component 434, the internal component 434 can send a request for a metric to the metric service 422 that contains a descriptor object. The metric service 422 can create a metric instance, in response. For example, the metric manager 438 of the metric service 422 can consult the metric map manager 448 to determine whether the identification metadata of the metric in the request maps to a known unique identifier. The metric manager 438 can perform a check with the metric registry 424 to determine if the identification metadata matches to any metric instances in use. If the identification metadata does not match any metric instances in use but does match a metric instance that is no longer in use but for which persisted time series data still exists (e.g., has not yet aged out), then the requested metric is a metric that previously existed but is no longer in use. However, because the metric map manager 448 contains a reference to the metric, the metric's previous use was recent enough that not all time series data has aged out. To provide continuity from the previous data to data that will be collect anew, the same unique identifier is reregistered (e.g., reassigned) to the newly created metric and returned, as previously described, to the external component 428 and/or internal component 434.

In various examples, the metric service 422 can restore a metric instance associated with a metric within the controller 420 upon failure of a portion of the SDN. For instance, an external component 428, internal component 434 and/or the controller 420/metric proxy 426/metric service 422 can have a failure (e.g., shut down). The failure can cause the portion of the SDN to shut-down for a period of time, for example. In response to the failure and a subsequent call (e.g., API call) for the metric from an external component 428 and/or an internal component 434, metadata of the metric can be identified in storage of the SDN (e.g., in storage of the controller 420) and the metric instance can be restored using the identified metadata.

In some examples, the external component 428 and/or the internal component 434 of the environment may have a failure. As previously discussed, identification metadata of the metric can be mapped to a unique identifier of the metric and the unique identifier can be saved in storage of the controller 420 (e.g., the hashmap retained by the metric map manager 448). Once the external component 428 and/or internal component 434 restores connection (e.g., resolves the failure), the external component 428 and/or internal component 434 can resend a request for the metric to the metric proxy 426 (e.g., for an external component 428) and/or to the metric service 422 (e.g., for an internal component 434). The metric service 422 can search for the unique identifier (e.g., persisted in storage) using the identification metadata of the metric in the call. In response to identifying the metric previously existed (e.g., finding the unique identifier using the identification metadata), the unique identifier can be reregistered (e.g., reassigned) to the metric to restore the metric instance and returned, as previously described, to the external component 428 and/or the internal component 434.

As an example, the metric proxy 426 can notify the metric service 422 of the request for the metric from the external component 428 and/or the internal component 434 can send a request to the metric service 422 for the metric. The metric manager 438 can consult the metric map manager 448 to determine whether the identification metadata in the request for the metric maps to a known unique identifier. In response to the identification metadata mapping to a unique identifier stored in the hashmap of the metric map manager 448, the metric service 422 can reregister the unique identifier to the metric to restore the metric instance. Thereby, values for the metric that are sent from the external component 428 and/or internal component 434 before and after the failure can be stored with a reference to the same unique identifier. A subsequent call for time series data of the metric instance by the external component 428 and/or internal component 434 of the SDN can return time series data from before and after the failure.

Alternatively, the controller 420, metric service 422, and/or metric proxy 426 can have a failure. Because the metric service 422 and metric proxy 426 are located within the controller 420, in some examples, if the controller 420 has a failure then the metric service 422 and metric proxy 426 may also have a failure. In such examples, once the controller 420, metric service 422, and/or metric proxy 426 restores connection (e.g., resolves the failure) to the SDN, the external component 428 can send an API call to update the metric value to the metric proxy 426. The unique identifier of the metric in the call can be used to search in the metric map manager 448 to determine whether the unique identifier maps, initialized upon recovery from the metric descriptor storage 446 and the file system (e.g., descriptors 430), for a persisted value to determine whether the metric was already in use before the failure. In response to finding a persisted value (e.g., persisted descriptor information in storage 430), the metric instance can be recreated in storage of the controller 420 and the recreated metric instance can be updated with the time stamped value of the metric contained in the call.

In various examples, the metric service 422 can have a failure while the metric proxy 426, internal component 434, and/or other components internal to the controller 420 do not have a failure. In such instances, the internal component 434 and/or the metric proxy 426 can hold one or more metric instances (e.g., object containing descriptor information and/or other metadata of the metric and/or that tracks value updates of the metric) in storage of the controller 420. The metric instances exist in storage of the controller 420 (e.g., stored in RAM) because the internal component 434 that requested the metrics have references to the one or more metric instances and/or the metric proxy 426 has references to the one or more metric instances of metrics requested from the external component 428. When the metric service 422 recovers from the failure, the internal component 434 and/or the metric proxy 426 can re-register the one more metrics that the external component 428 and/or internal component 434, respectively, have references to (e.g., using the metric instances stored in RAM). The metric service 422 can subsequently resume summarizing and persisting values for the metric instances.

In some examples, the external component 428 and/or the internal component 434 may send a call while the failure is occurring (and the call may fail). In such instances, the external component 428 and/or the internal component 434 can resend the call at the next predefined period of time, at a preset time (e.g., try again in five minutes) and/or at the next update to the value of the metric, among other times. In other instances, the controller 420, metric service 422, and/or metric proxy 426 may reconnect/resolve a failure prior to the external component 428 and/or the internal component 434 sending a call; in such instances, the external component 428 and/or the internal component 434 can be unaware of the failure.

Although the present environment examples of FIGS. 3 and 4 illustrate a single controller 320, 420, environments in accordance with the present disclosure are not so limited. For example, environments can include a plurality of controllers. Each of the plurality of controllers can include a metric service instance, a metric proxy instance, a metric registry instance, and/or the various other features described in relation to FIGS. 3 and 4. Alternatively, one of the plurality of controllers can include a master controller for the network that includes the metric service, a metric proxy, a metric registry, and/or the various other features described in relation to FIGS. 3 and 4.

Figure 5:
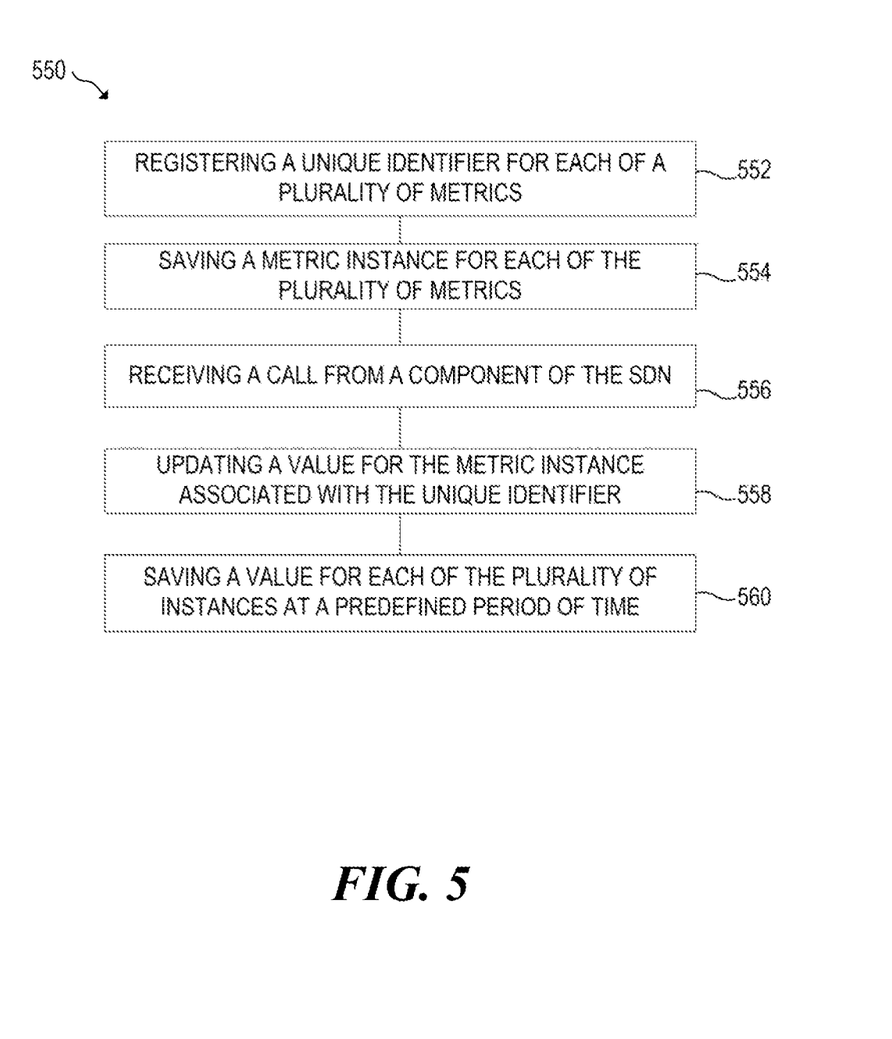
FIG. 5 illustrates a flow chart of an example of a method for processing metrics of components of a SDN according to the present disclosure.

FIG. 5 illustrates a flow chart of an example of a method 550 for processing metrics of components of a SDN according to the present disclosure. At 552, the method 550 can include registering a unique identifier for each of a plurality of metrics, each of the plurality of metrics being associated with a metric requested by a component of a SDN.

At 554, the method 550 can include saving, in storage of the SDN, a metric instance (e.g., an object containing descriptor information and/or other metadata of the metric) for each of the plurality of metrics. For example, the metric instances can be saved in RAM and/or in non-volatile memory of the controller of the SDN and/or an external component of the controller at a summary interval. The metric instance, as previous discussed, can include the descriptor information for each metric requested for creation.

At 556, the method 550 can include receiving a call from a component of the SDN. The component can include an internal or external component to the controller of the SDN. The call can include a value for a metric among the plurality of metrics and the unique identifier of the metric. For example, the call can include a REST API call from the external component to a metric proxy within the controller. The value can, for instance, be time stamped with the current time of the controller by the metric service. At 558, the method 550 can include updating a value for the metric instance associated with the unique identifier using the value.

At 560, the method 550 can include saving, in storage of the SDN, a value for each of the plurality of metric instances at a predefined period of time, including a summarized value for the metric. For instance, in some examples, the updated value for the metric can be used to compute the summarized value. The value stored for each of the plurality of metrics can include summarized values for each metric. The storage can include storage within the controller and/or an external component to the controller (e.g., a separate processing node). The predefined period of time can include, for example, a summary interval.

In a number of examples, the call from the component can include or not include an updated value for the metric. For instance, the metric instance in storage of the SDN can be searched for in response to the call. The value contained in the call can be applied to the metric instance in response to the value including an update (e.g., not matching the previously persisted value). The values contained in the call may or may not be applied to the metric instance in response to the value including the same value as stored within the SDN (e.g., matching the previously persisted value)

In some examples, time series data can be returned for at least a portion of the plurality of metrics in response to an API call for the values. For instance, a component (e.g., external or internal) can call for time series data of one or more metrics. The time series data corresponding to the unique identifiers and/or metadata in the call (e.g., a REST API call) can be returned to the component.

In accordance with various examples of the present disclosure, a metric instance can be terminated. For example, the external component can send a call to the metric proxy to terminate a metric instance requested by the external component and/or an internal component can request the metric service to terminate a metric instance. The metric instance can be terminated, for instance, using the metric service, in response to notification from the metric proxy of the request and/or in response to the request from the internal component. The metric instance can be deactivated and removed from memory, no longer used to store new times series data, but the metric metadata and time series data saved before the metric is terminated may not be deleted from storage until the most recent time series data saved for the metric is aged out of the data store. Alternatively, all stored data relating to a terminated metric can be removed from the data store, including metric metadata and time series data. The above provided examples illustrated in FIGS. 1-4 can be performed by and/or using a metric service. The metric service can be used by SDN applications that may have components that are internal and/or external to the controller of the SDN. The metric service can allow such components, irrespective of their location relative to the controller, to register metrics of various types with the metric service. The components are given a unique identifier for each metric upon its creation that allows the components to uniquely identify the metric during subsequent updates of the metric value. The updates may be done with any frequency and at regular or irregular intervals. The components can further terminate the metric when it is no longer needed. Metrics can be exposed to real-time inspection via other services, such as JMX.

Metric values can be saved as time series data. For instance, the metric service can periodically summarize metric values and persist the summarized values to disk as time series data. Such data can be retained for metrics that are terminated until the last of the time series data for a give metric has aged out. The time series data may be aged by several criteria, including how old the data is, how large the data store is, or how much free space remains on the medium used to store the data. The time series data may be retrieved by other applications that wish to analyze it, and information is persisted along with the summarized values that permit the requestor to either analyze the raw summarized values that are returned or normalize them as rates.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system for processing a metrics of a software-defined network (SDN, comprising:
   a processor and a non-transitory computer readable medium to implement:
   a metric proxy engine to create a descriptor object in response to a request for the metric from a component external to a controller of a SDN; and
   a metric service engine to:
   create a metric instance for the metric requested using the descriptor object;
   register a unique identifier associated with the metric in storage of the SDN; and
   delete stored data based on at least of one of a threshold period of time and a threshold data size.

2. The system of claim 1, wherein the metric proxy engine returns the registered unique identifier as part of a return to an application program interface (API) call from the external component to request the creation of the metric.

3. The system of claim 1, wherein the metric proxy engine updates the metric instance with the value in response to a received call containing the value and the unique identifier of the metric instance to be updated from the external component.

4. The system of claim 3, wherein the external component sends the value of the metric and the unique identifier of the metric instance at least one of a predefined period of time, when the value is changed, and randomly.

5. The system of claim 1, wherein the metric service engine time stamps an updated value of the metric and saves the updated time stamped value of the metric in the storage of controller at a predefined period of time.

6. The system of claim 1, wherein registering the unique identifier includes the metric service engine mapping identification metadata of the metric to the unique identifier.

7. The system of claim 1, wherein the metric service engine saves a summarized value for each of a plurality of existing metric instances, including the metric, at a predefined period of time.

8. The system of claim 7, wherein the metric service engine saves a time span for each of the plurality of metric instances corresponding to the predefined period of time.

9. A non-transitory computer-readable medium storing instructions executable by a processing resource to cause a computer to:

map identification metadata of a metric to a unique identifier of the metric, the metric including a metric requested by a component of a software-defined network (SDN);

save the unique identifier in storage of the SDN;

identify metadata of the metric in storage in response to failure of a portion of the SDN and a subsequent call for the metric from the component, the call including identification metadata of the metric; and restore a metric instance associated with the metric using the identified metadata of the metric.

10. The non-transitory computer-readable medium of claim 9, wherein the instructions executable by the processing resource to identify the metadata include instructions executable to search for the unique identifier using the identification metadata in the call.

11. The non-transitory computer-readable medium of claim 9, wherein the instructions executable by the processing resource to identify the metadata include instructions executable to search for a persisted value of the metric using the unique identifier for the metric in the call.

12. The non-transitory computer-readable medium of claim 9, wherein the instructions executable by the processing resource to restore the metric instance include instructions executable to reassign the unique identifier to the metric in response to identifying the unique identifier using the identification metadata in the call.

13. The non-transitory computer-readable medium of claim 9, wherein the instructions executable by the processing resource to restore the metric instance include instructions executable to:

recreate the metric instance in storage of the SDN; and update the metric instance to include a value of the metric contained in the call.

14. A method of processing a metric of an external component, comprising:

registering a unique identifier for each of a plurality of metrics, each of the plurality of metrics being associated with a metric requested by a component of a software-defined network (SDN);

saving, in storage of the SDN, a metric instance for each of the plurality of metrics;

receiving a call from a component of the SDN, the call including a value for a metric among the plurality of metrics and the unique identifier of the metric;

updating a value for the metric instance associated with the unique identifier using the value; and saving, in storage of the SDN, a value for each of the plurality of metric instances at a predefined period of time, including a summarized value for the metric.

15. The method of claim 14, including:

searching for the metric instance in storage based on the unique identifier in response to the call; and applying the value to the metric instance in response the value in the call including an update.

16. The method of claim 14, including:

searching for the metric instance in storage based on the unique identifier in response to the call; and not applying the value to the metric instance in response the value in the call including the same value as stored in storage of the SDN.

17. The method of claim 14, including returning time series data for at least a portion of the plurality of metrics in response to a call for the values.

18. The method of claim 14, including terminating the metric instance of the metric requested by the component in response to a request from the component.

* * * * *